United States Patent
Inaba

(10) Patent No.: US 11,097,745 B2
(45) Date of Patent: *Aug. 24, 2021

(54) DRIVING SUPPORT METHOD, VEHICLE, AND DRIVING SUPPORT SYSTEM

(71) Applicant: TOYOTA JIDOSHA KABUSHIKI KAISHA, Toyota (JP)

(72) Inventor: Chihiro Inaba, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,601

(22) Filed: Jul. 29, 2020

(65) Prior Publication Data

US 2020/0353946 A1    Nov. 12, 2020

Related U.S. Application Data

(63) Continuation of application No. 16/272,244, filed on Feb. 11, 2019, now Pat. No. 10,759,447.

(30) Foreign Application Priority Data

Feb. 27, 2018    (JP) .............................. JP2018-033596

(51) Int. Cl.
*B60W 50/14*    (2020.01)
*G10L 15/18*    (2013.01)
(Continued)

(52) U.S. Cl.
CPC ............. *B60W 50/14* (2013.01); *G06F 3/167* (2013.01); *G06K 9/00845* (2013.01);
(Continued)

(58) Field of Classification Search
CPC ........... B60W 50/14; B60W 2050/143; B60W 2050/146; G01S 5/22; G01S 5/18;
(Continued)

(56) References Cited

U.S. PATENT DOCUMENTS

2006/0253282 A1    11/2006    Schmidt et al.
2009/0125311 A1*    5/2009    Haulick .............. B60R 16/0373
                                                                704/275
(Continued)

FOREIGN PATENT DOCUMENTS

DE    10131720 A1    1/2003
JP    H08-002339 A    1/1996
(Continued)

OTHER PUBLICATIONS

Oct. 28, 2019 Office Action Issued in U.S. Appl. No. 16/272,244.
(Continued)

*Primary Examiner* — Emily C Terrell
(74) *Attorney, Agent, or Firm* — Oliff PLC

(57) ABSTRACT

A driving support method for a vehicle includes: acquiring a sound of a sound source placed outside the vehicle; and displaying, on a display portion, driving support information corresponding to an utterance content of the sound, the utterance content of the sound being recognized by a sound recognition process, in a display mode suggesting a relative position of the sound source from the vehicle, the relative position being specified based on the sound.

10 Claims, 11 Drawing Sheets

(51) Int. Cl.
    *G06K 9/00* (2006.01)
    *G06F 3/16* (2006.01)
    *G10L 15/08* (2006.01)

(52) U.S. Cl.
    CPC .... *G10L 15/1815* (2013.01); *B60W 2050/146* (2013.01); *G10L 2015/088* (2013.01)

(58) Field of Classification Search
    CPC . G06F 3/167; G06K 9/00845; G10L 15/1815; G10L 2015/088
    USPC ...................................................... 340/425.5
    See application file for complete search history.

(56) References Cited

U.S. PATENT DOCUMENTS

| | | |
|---|---|---|
| 2010/0033313 A1 | 2/2010 | Keady et al. |
| 2011/0199198 A1 | 8/2011 | Yang et al. |
| 2016/0009175 A1 | 1/2016 | McNew |
| 2016/0355125 A1 | 12/2016 | Herbert |
| 2017/0021768 A1 | 1/2017 | Jaegal et al. |
| 2017/0153714 A1 | 6/2017 | Gao et al. |

FOREIGN PATENT DOCUMENTS

| | | | |
|---|---|---|---|
| JP | H10-031882 A | 2/1998 | |
| JP | 2003-004521 A | 1/2003 | |
| JP | 2006-092482 A | 4/2006 | |
| JP | 2007-034348 A | 2/2007 | |
| JP | 2010-067165 A | 3/2010 | |
| JP | 2011-232292 A | 11/2011 | |
| JP | 5622819 B2 | 11/2014 | |
| JP | 2015-005935 A | 1/2015 | |
| JP | 2016-203815 A | 12/2016 | |
| WO | WO-2012097150 A1 * | 7/2012 | ............. G10L 17/26 |

OTHER PUBLICATIONS

Jan. 30, 2020 Office Action issued in U.S. Appl. No. 16/272,244.
May 15, 2020 Notice of Allowance Issued in U.S. Appl. No. 16/272,244.

\* cited by examiner

FIG. 10
| UTTERANCE CONTENT (TYPE) | DRIVING SUPPORT INFORMATION |
|---|---|
| STOP | 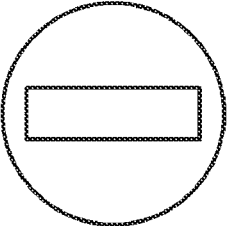 |
| MOVE FORWARD | 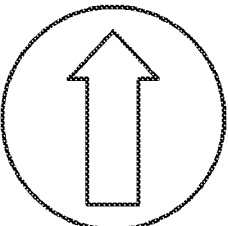 |
| ... | ... |

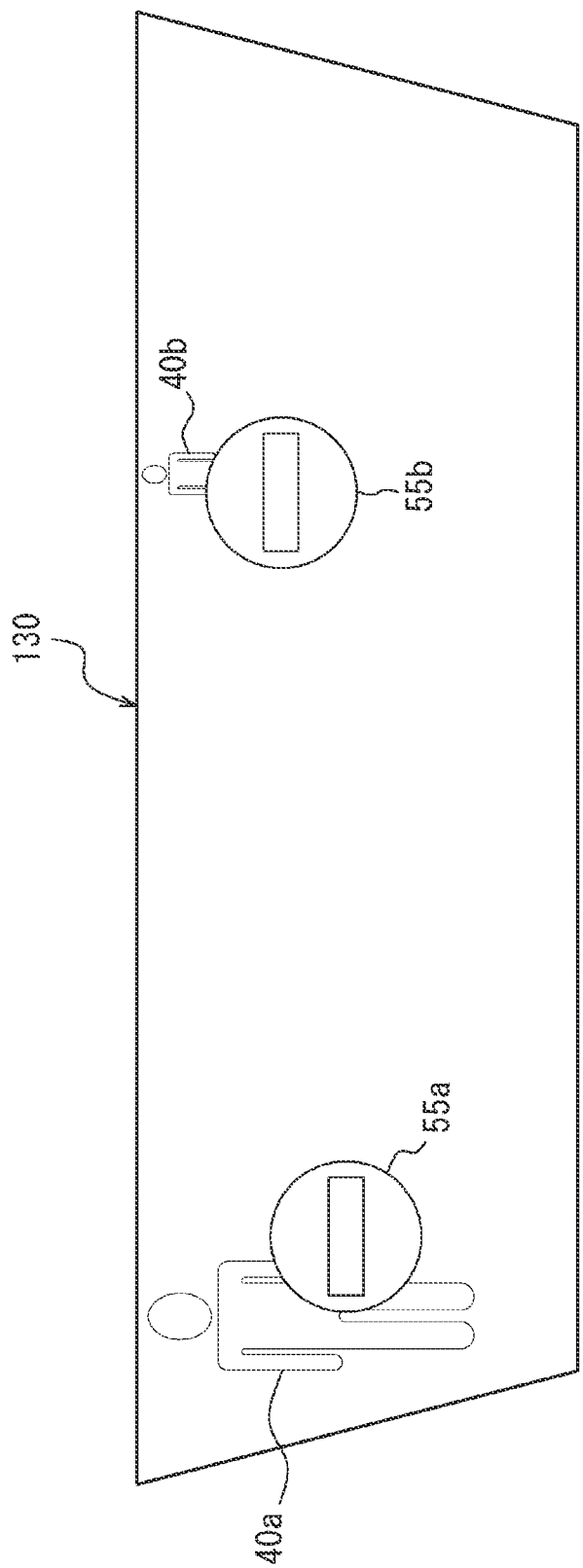

DRIVING SUPPORT METHOD, VEHICLE, AND DRIVING SUPPORT SYSTEM

INCORPORATION BY REFERENCE

This application is a continuation of application Ser. No. 16/272,244, filed on Feb. 11, 2019, which claims priority to Japanese Patent Application No. 2018-033596, filed on Feb. 27, 2018, both of which are hereby incorporated herein by reference in their entireties.

BACKGROUND

1. Technical Field

The disclosure relates to a driving support method, a vehicle, and a driving support system.

2. Description of Related Art

There has been known a technique that performs driving support for a vehicle such as an automobile. For example, Japanese Unexamined Patent Application Publication No. 2016-203815 (JP 2016-203815 A) discloses the following configuration. That is, when the volume of a sound taken by an in-vehicle microphone or the change of the volume exceeds a first determination threshold and the volume of a sound taken by an out-of-vehicle microphone or the change of the volume is a second determination threshold or less, it is determined that there is an urgent utterance of an occupant, and a drive motor of an automatic window is stopped. Further, Japanese Unexamined Patent Application Publication No. 2010-067165 (JP 2010-067165 A) discloses the following configuration. That is, an approach direction of an emergency vehicle that blows a siren is specified based on siren detection states obtained by a plurality of microphones provided at different positions on a vehicle, and an output corresponding to at least either one of recognition support and driving support in accordance with the approach direction of the emergency vehicle is performed. Further, Japanese Unexamined Patent Application Publication No. 2006-092482 (JP 2006-092482 A) discloses the following configuration. That is, a specific sound such as a warning sound of an emergency vehicle is sorted from sounds outside a vehicle, for example, and based on a detection result of an occurrence direction of the specific sound, a navigation system is instructed to display an occurrence position of the specific sound on map data. Further, Japanese Unexamined Patent Application Publication No. 8-002339 (JP 8-002339 A) discloses a configuration in which an out-of-vehicle sound collected by a microphone is amplified by an amplifier, and the out-of-vehicle sound is played in a vehicle cabin form a speaker. Further, Japanese Patent No. 5622819 discloses a configuration in which, when an out-of-vehicle object placed ahead of a vehicle is recognized based on an image from a stereo camera, a caution for the out-of-vehicle object is displayed. Further, Japanese Unexamined Patent Application Publication No. 2007-034348 (JP 2007-034348 A) discloses the following configuration. That is, a result of a sound with emergency such as an ambulance siren, identified from sounds around a vehicle, for example, is notified to a driver by means of vibration, sound, or display.

SUMMARY

In the meantime, according to a recent research in the field of cognitive science, it is found that, when a listener tries to verbally recognize an utterance content, a cognitive load can occur to the listener. On this account, a driver of a vehicle may unconsciously avoid recognition of an utterance content caused outside the vehicle so as to decrease a cognitive load. Accordingly, the possibility that the driver of the vehicle recognizes a sound caused by an utterance made outside the vehicle is low in comparison with a nonverbal sound such as a waring sound of an emergency vehicle, and the like, for example.

Further, a warning of the emergency vehicle is highly likely to be recognized by the driver because a warning sound is continuously given for a relatively long time. In the meantime, in terms of an utterance, a sound is given only at the time when the utterance is made, so that the utterance is relatively less likely to be recognized by the driver.

The above technique is to execute driving support for a vehicle by use of a nonverbal sound such as the warning sound of the emergency vehicle, for example, and does not execute driving support for the vehicle by use of a sound caused by an utterance made outside the vehicle.

The disclosure provides a driving support method, a vehicle, and a driving support system each of which can achieve driving support for the vehicle by use of a sound caused by an utterance made outside the vehicle.

A first aspect of the disclosure provides a driving support method for a vehicle. The driving support method includes: acquiring a sound of a sound source placed outside the vehicle; and displaying, on a display portion, driving support information corresponding to an utterance content of the sound, the utterance content of the sound being recognized by a sound recognition process, in a display mode suggesting a relative position of the sound source from the vehicle, the relative position being specified based on the sound.

A second aspect of the disclosure provides a vehicle. The vehicle includes: a sound acquisition portion configured to acquire a sound of a sound source placed outside the vehicle; and a controlling portion configured to display, on a display portion, driving support information corresponding to an utterance content of the sound, the utterance content of the sound being recognized by a sound recognition process, in a display mode suggesting a relative position of the sound source from the vehicle, the relative position being specified based on the sound.

A third aspect of the disclosure provides a driving support system. The driving support system includes: a vehicle; and a server configured to communicate with the vehicle, wherein: the vehicle is configured to acquire a sound of a sound source placed outside the vehicle; the vehicle or the server is configured to specify a relative position of the sound source from the vehicle based on the sound; the vehicle or the server is configured to recognize an utterance content of the sound by a sound recognition process; and the vehicle is configured to display, on a display portion, driving support information corresponding to the utterance content, in a display mode suggesting the relative position of the sound source.

With the driving support method, the vehicle, and the driving support system according to the above aspect, it is possible to achieve driving support for the vehicle by use of a sound caused by an utterance made outside the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a view illustrating an example of information stored in an information processing system according to a modification of the embodiment; and FIG. 11 is a view illustrating an example of the screen displayed on the display device in the modification.

DETAILED DESCRIPTION OF EMBODIMENTS

Descriptions are now made of an embodiment of the disclosure.

Configuration of Driving Support System

Figure 1:
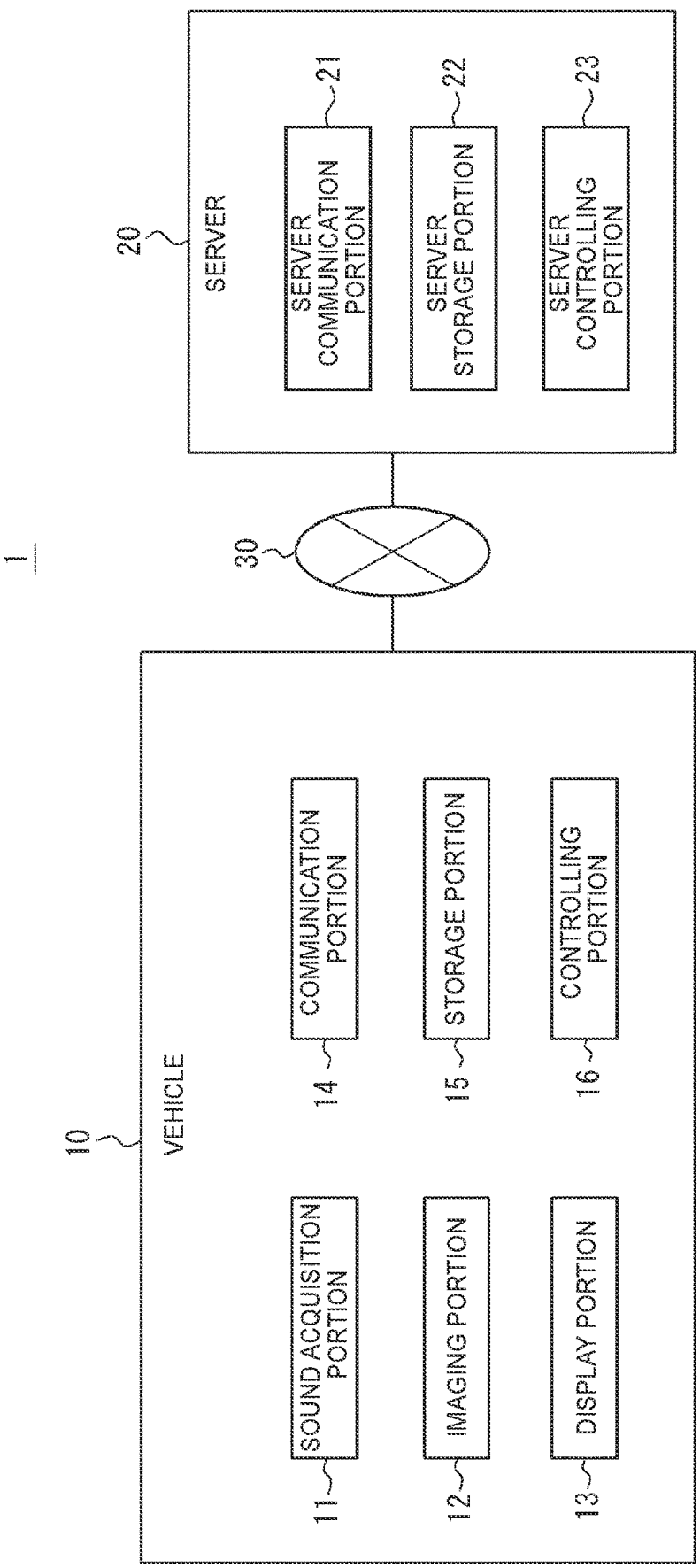
FIG. 1 is a block diagram illustrating a schematic configuration of a driving support system according to one embodiment of the disclosure.

With reference to FIG. 1, the following describes the outline of a driving support system 1 according to one embodiment of the disclosure. The driving support system 1 includes a vehicle 10 and a server 20. The vehicle 10 includes an automobile, for example, but may include other vehicles. The server 20 includes one or more server devices communicable with each other. In the present embodiment, for simplification of the description, the description deals with the server 20 as one server device. The vehicle 10 and the server 20 are communicably connected to each other via a network 30. The network 30 may include the Internet, for example, but may include other networks.

In the driving support system 1, the vehicle 10 and the server 20 work together so as to execute driving support for the vehicle 10. As a summary, the driving support system 1 acquires a sound from a sound source placed outside the vehicle 10. Here, the "sound" in the present specification indicates a series of sounds having a verbal meaning. The driving support system 1 specifies a relative position of the sound source from the vehicle 10 based on the sound thus acquired. The driving support system 1 recognizes an utterance content of the sound by a sound recognition process. The driving support system 1 displays driving support information corresponding to the recognized utterance content in a visually recognizable manner to a driver in a display mode suggesting the relative position of the sound source from the vehicle 10.

With the operation of the driving support system 1, in a case where a traffic controller placed outside the vehicle 10 makes an utterance toward the vehicle 10, for example, driving support information such as a text string or the like indicating the content of the utterance is displayed. On this account, even in a case where the driver cannot catch the utterance of the traffic controller, the driver can visually recognize an utterance content at a glance by visually recognizing the driving support information. This accordingly achieves the driving support for the vehicle 10 by use of a sound caused by the utterance made outside the vehicle 10.

Further, in a case where the traffic controller is placed on the left side ahead of the vehicle 10, the driving support information is displayed in a display mode suggesting the left side ahead of the vehicle 10. On this account, even in a case where the driver does not notice the presence of the traffic controller, for example, the driver can recognize a relative position of the traffic controller at a glance by visually recognizing the driving support information. This accordingly improves the convenience of the driving support for the vehicle 10 by use of the sound caused by the utterance made outside the vehicle 10.

Next will be described details of each constituent of the driving support system 1.

Configuration of Vehicle

As illustrated in FIG. 1, the vehicle 10 includes a sound acquisition portion 11, an imaging portion 12, a display portion 13, a communication portion 14, a storage portion 15, and a controlling portion 16. The sound acquisition portion 11, the imaging portion 12, the display portion 13, the communication portion 14, the storage portion 15, and the controlling portion 16 are communicable with each other via an in-vehicle network such as a controller area network (CAN) or an exclusive line, for example.

Figure 2:
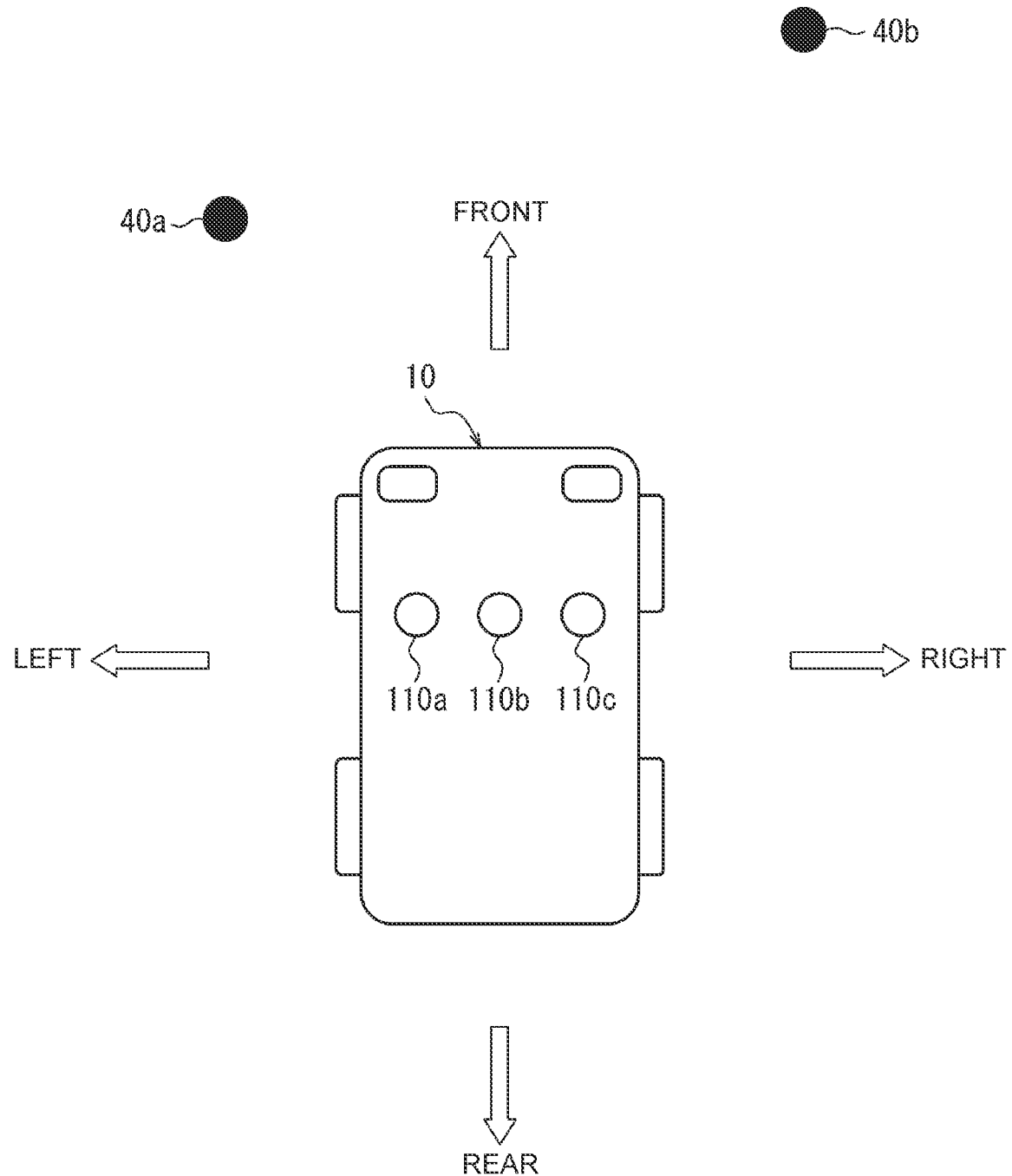
FIG. 2 is a view illustrating an example of a surrounding state around a vehicle.

The sound acquisition portion 11 includes three or more microphones provided at different mounting positions in the vehicle 10. In the present embodiment, each of the microphones of the sound acquisition portion 11 acquires sounds from one or more sound sources placed outside the vehicle 10. For example, in a surrounding state around the vehicle 10 as illustrated in FIG. 2, each of three microphones 110 (110a to 110c) of the sound acquisition portion 11 acquires sounds of two sound sources 40 (40a and 40b) placed outside the vehicle 10. The sound source 40 is a traffic controller, for example, but is not limited to this. The sound source 40 may include a human being, a machine, or the like that makes an utterance.

The imaging portion 12 includes one or more cameras. In the present embodiment, the imaging portion 12 generates a captured image of the sound source 40 placed outside the vehicle 10. The imaging portion 12 may produce a plurality of captured images (that is, a video image) at a predetermined frame rate. For example, in the surrounding state around the vehicle 10 as illustrated in FIG. 2, the imaging portion 12 produces one or more captured images of the sound source 40a placed on the left side ahead of the vehicle 10 and the sound source 40b placed on the right side ahead of the vehicle 10.

The sound acquisition by the sound acquisition portion 11 and the production of captured images by the imaging portion 12 may be performed in synch. For example, captured images may be produced by the imaging portion 12 at a predetermined frame rate while sounds are acquired by the sound acquisition portion 11. In the following description, one or more captured images of the sound source 40, produced by the imaging portion 12 during sound acquisition from the sound source 40, are also referred to as one or more captured images corresponding to the sound source 40.

The display portion 13 includes a display for displaying any given information. In the present embodiment, the display portion 13 may be a head-up display that projects information to a driver's view field. In such a case, an optical member of the vehicle 10 such as a windshield or a combiner may constitute a part of the head-up display, for example. Alternatively, the display portion 13 may be a panel display for displaying information on a display panel such as a liquid crystal panel or an organic electroluminescence (EL) panel. In such a case, a display of a navigation device provided in the vehicle 10, or a display of a mobile terminal such as a smartphone, for example, may be used as the display portion 13.

The communication portion 14 includes one or more communication interfaces. In the present embodiment, the vehicle 10 wirelessly communicates with the server 20 via the communication portion 14 and the network 30.

The storage portion 15 includes one or more memories. The memories may include, for example, a semiconductor memory, a magnetic memory, an optical memory, and the like. Each memory included in the storage portion 15 may function as a main memory, an auxiliary memory, or a cache memory, for example. Information used for the operation of the vehicle 10 is stored in the storage portion 15.

The controlling portion 16 includes one or more processors. The processors may include a general-purpose processor and an exclusive processor devoted to a specific process. For example, an electronic control unit (ECU) provided in the vehicle 10 may function as the controlling portion 16. The controlling portion 16 controls the operation of the whole vehicle 10.

For example, the controlling portion 16 specifies a relative position, from the vehicle 10, of the sound source 40 placed outside the vehicle 10 based on the sound of the sound source 40, the sound acquired by the sound acquisition portion 11. The relative position is specified by use of any given coordinate system an origin of which is set at the vehicle 10. For example, the relative position may be specified by a direction and a distance of the sound source 40 from the origin at the vehicle 10, that is, by polar coordinates. In a case where the sounds of the sound sources 40 are acquired by the sound acquisition portion 11, the controlling portion 16 specifies a relative position of each of the sound sources 40. Here, any given sound source location algorithm can be employed for the specification of the relative position of the sound source 40. For example, the controlling portion 16 may specify the relative position of the sound source 40 based on the mounting positions of the microphones 110 included in the sound acquisition portion 11 and a time difference in arrival of the sound of the sound source 40 between the microphones 110.

The controlling portion 16 isolates, from each other, respective sounds of the sound sources 40 in the sounds acquired by the sound acquisition portion 11. Here, any given sound isolation algorithm can be employed for the isolation of the respective sounds of the sound sources 40 from each other. For example, the controlling portion 16 may isolate the respective sounds of the sound sources 40 from each other by performing beam foaming so as to turn the directivity of the sound acquisition portion 11 toward respective directions of the sound sources 40, from the vehicle 10, specified by sound source location. Further, the controlling portion 16 may perform reduction or removal of noise from each of the sounds thus isolated.

The controlling portion 16 performs an utterance detection process on each of the sounds thus isolated. An utterance in a sound can be detected by the utterance detection process. Any given utterance detection algorithm can be employed for the utterance detection process. For example, the controlling portion 16 may detect, as an utterance, each sound zone determined based on an amplitude and a zero-intersection number of a sound signal.

The controlling portion 16 transmits, to the server 20, a sound in which an utterance is detected in association with the sound source 40 corresponding to the sound. Further, the controlling portion 16 transmits, to the server 20, a relative position and one or more captured images of the sound source 40 corresponding to the sound in which the utterance is detected.

The controlling portion 16 can receive, from the server 20, driving support information corresponding to an utterance content of the sound recognized by the sound recognition process executed by the server 20 as will be described below. When the controlling portion 16 receives the driving support information from the server 20, the controlling portion 16 displays the driving support information on the display portion 13 in a display mode suggesting a relative position of a corresponding sound source 40. A concrete example of a screen displayed on the display portion 13 will be described later.

Configuration of Server

As illustrated in FIG. 1, the server 20 includes a server communication portion 21, a server storage portion 22, and a server controlling portion 23.

The server communication portion 21 includes one or more communication interfaces. In the present embodiment, the server 20 wirelessly communicates with the vehicle 10 via the server communication portion 21 and the network 30.

The server storage portion 22 includes one or more memories. Each memory included in the server storage portion 22 may function as a main memory, an auxiliary memory, or a cache memory, for example. Information used for the operation of the server 20 is stored in the server storage portion 22.

The server controlling portion 23 includes one or more processors. The server controlling portion 23 controls the operation of the whole server 20.

For example, the server controlling portion 23 receives, from the vehicle 10, a sound in which an utterance is detected and a relative position and one or more captured images of the sound source 40 corresponding to the sound. The server controlling portion 23 converts the sound into a text string and verbally recognizes an utterance content of the sound by the sound recognition process.

The server controlling portion 23 evaluates significance of the recognized utterance content based on one or more pieces of information about the sound source 40 of the sound corresponding to the utterance content. In the following description, information about the sound source 40 is also referred to as sound source information. In the present embodiment, the server controlling portion 23 evaluates significance of the utterance content based on at least one of five pieces of sound source information, i.e., the length of the sound of the sound source 40 or its utterance content (first sound source information), a word included in the utterance content (second sound source information), a context of the utterance content (third sound source information), a sound pressure of the sound (fourth sound source information), and an execution result of an image recognition process using one or more captured images of the sound source 40 of the sound (fifth sound source information). More specifically, the server controlling portion 23 determines whether or not a total value, an average value, or a maximum value (hereinafter referred to as the "total value or the like") of points determined for respective pieces of sound source information is a predetermined reference value or more, as will be explained later. In a case where the total value or the like of the points is the reference value or more, the server controlling portion 23 determines that the utterance content is significant. In the meantime, in a case where the total value or the like of the points is less than the reference value, the server controlling portion 23 determines that the utterance content is not significant.

Here, the following describes a concrete example of the operation of the server controlling portion 23 to determine a point for each of the first sound source information to the fifth sound source information.

First described is the first sound source information. The server controlling portion 23 determines a time length of the sound of the utterance content or the number of letters in a text string indicative of the utterance content as the length of the sound of the sound source 40 or the utterance content. Then, the server controlling portion 23 determines a point for the first sound source information based on the length of the sound or the utterance content. Here, as the length of the sound or the utterance content is longer, information that should be recognized by the driver of the vehicle 10 is highly probably included in the utterance content. On this account, the server controlling portion 23 may give a larger point for the first sound source information as the length of the sound or the utterance content is longer.

Subsequently, the following describes the second sound source information. One or more keywords and respective points for the keywords are stored in the server storage portion 22 in advance. A point for a keyword may be determined to a given amount, for example, based on a property of the keyword such as emergency or importance. For example, a keyword "stop" that is highly probably used in an utterance with high emergency may have a larger point than a keyword "move" that is highly probably used in an utterance with low emergency. When the utterance content is recognized as described above, the server controlling portion 23 detects a keyword included in the utterance content. The server controlling portion 23 determines the total value or the like of points for respective detected keywords as a point for the second sound source information.

Next will be described the third sound source information. In terms of the sound source 40 of the sound of the utterance content the significance of which is to be evaluated, the server controlling portion 23 determines whether or not an utterance content of a previous utterance of the sound source 40 is determined to be significant. In a case where the server controlling portion 23 determines that the utterance content of the previous utterance is significant, the server controlling portion 23 determines a point for the third sound source information. In the meantime, in a case where the server controlling portion 23 determines that the utterance content of the previous utterance is not significant, the server controlling portion 23 may not determine a point for the third sound source information, or the server controlling portion 23 may determine, as the point for the third sound source information, a point smaller than the point given when it is determined that the utterance content of the previous utterance is significant.

Next will be described the fourth sound source information. The server controlling portion 23 detects a sound pressure of the sound of the utterance content. Here, as a distance between the vehicle 10 and the sound source 40 is longer, the sound pressure of the sound acquired in the vehicle 10 decreases as described above. On this account, the server controlling portion 23 may correct the detected sound pressure to be larger as the distance between the vehicle 10 and the sound source 40 is longer, based on the relative position of the sound source 40 from the vehicle 10. The server controlling portion 23 determines a point for the fourth sound source information based on the detected sound pressure. Here, as the sound pressure of the sound is larger, the utterance content is highly probably information that should be recognized by the driver of the vehicle 10. On this account, the server controlling portion 23 may give a larger point for the fourth sound source information as the detected sound pressure is larger.

Next will be described the fifth sound source information. The server controlling portion 23 determines whether or not the utterance of the sound source 40 is directed to the vehicle 10, based on one or more captured images of the sound source 40 by the image recognition process. For example, in a case where the sound source 40 is a human being, the server controlling portion 23 may refer to the one or more captured images and cut out an image in an estimated sound source direction from the captured images so as to extract the human being, and the server controlling portion 23 may recognize a sight line and a behavior (e.g., a gesture) of the human being. The gesture includes, for example, a guide action such as an action to wave a guide light, an action to wave a hand flag, or an action to urge the vehicle to stop, or an inquiry action such as a pointing action or an action to wave a hand. In a case where the server controlling portion 23 determines a gesture, it is necessary to use a video image (a moving image). In this case, the server controlling portion 23 cuts out a part in the estimated sound source direction from a plurality of consecutive frames and performs a recognition process on an extracted part (clip) by use of a technique such as a neural network. When the recognized sight line and behavior are directed to the vehicle 10, the server controlling portion 23 may determine that the utterance of the sound source 40 is directed to the vehicle 10. However, the determination is not limited to the above example, and any given algorithm using one or more captured images can be employed. In a case where it is determined that the utterance of the sound source 40 is directed to the vehicle 10, the server controlling portion 23 determines a point for the fifth sound source information. In the meantime, in a case where it is determined that the utterance of the sound source 40 is not directed to the vehicle 10, the server controlling portion 23 may not determine a point for the fifth sound source information, or the server controlling portion 23 may determine, as the point for the fifth sound source information, a point smaller than the point given when it is determined that the utterance of the sound source 40 is directed to the vehicle 10.

In a case where the server controlling portion 23 determines that the utterance content is significant based on the pieces of sound source information, the server controlling portion 23 transmits, to the vehicle 10, driving support information corresponding to the utterance content. For example, the driving support information may include a text string indicative of the utterance content. Here, the text string indicating the utterance content is a text string converted from the sound of the utterance by the sound recognition process, as described above. Alternatively, the driving support information may include a text string (a second text string) obtained by shortening the text string (a first text string) indicative of the utterance content. More specifically, the server controlling portion 23 omits, summarizes, or replaces some expressions included in the first text string indicative of the utterance content, and determines the second text string thus shortened. For example, the second text string may be determined by omitting an interjection included in the first text string. Here, an interjection such as "hey" that is highly probably given to the driver of the vehicle 10, for example, may not be omitted from the first text string. However, a technique to determine the second text string by shortening the first text string is not limited to the above example and may be determined in any given manner. Further, the driving support information is not limited to the above example and may include any given information based on which the driver of the vehicle 10 can recognize the utterance content by visual recognition. The driving support information transmitted to the vehicle 10 is displayed on the display portion 13 of the vehicle 10 in a display mode suggesting a relative position of a corresponding sound source 40, as described above. Here, in a case where the first text string is longer than a predetermined reference, the server controlling portion 23 may determine the second text string and transmit driving support information including the second text string to the vehicle 10. With such a configuration, it is possible to reduce occurrence of inconvenience such as distraction of the driver due to such a relatively long first text string being displayed on the display portion 13 of the vehicle 10, for example. In the meantime, in a case where the server controlling portion 23 determines that the utterance content is not significant based on the pieces of sound source information, the server controlling portion 23 may not transmit, to the vehicle 10, the driving support information corresponding to the utterance content.

With reference to FIGS. 2 to 8, the following describes a concrete example of the driving support information displayed in a display mode suggesting the relative position of the sound source 40. As illustrated in FIG. 2, for example, the following deals with a case where the sound source 40a is positioned on the left side ahead of the vehicle 10, the sound source 40b is positioned on the right side ahead of the vehicle 10, and utterances are made by the sound sources 40a and 40b. For example, when the sound source 40a makes utterances "excuse me," "please stop there once," and "stop!" and the sound source 40b makes an utterance "let the vehicle stop!," pieces of driving support information corresponding to utterance contents of these utterances are displayed on the display portion 13 of the vehicle 10.

Figure 3:
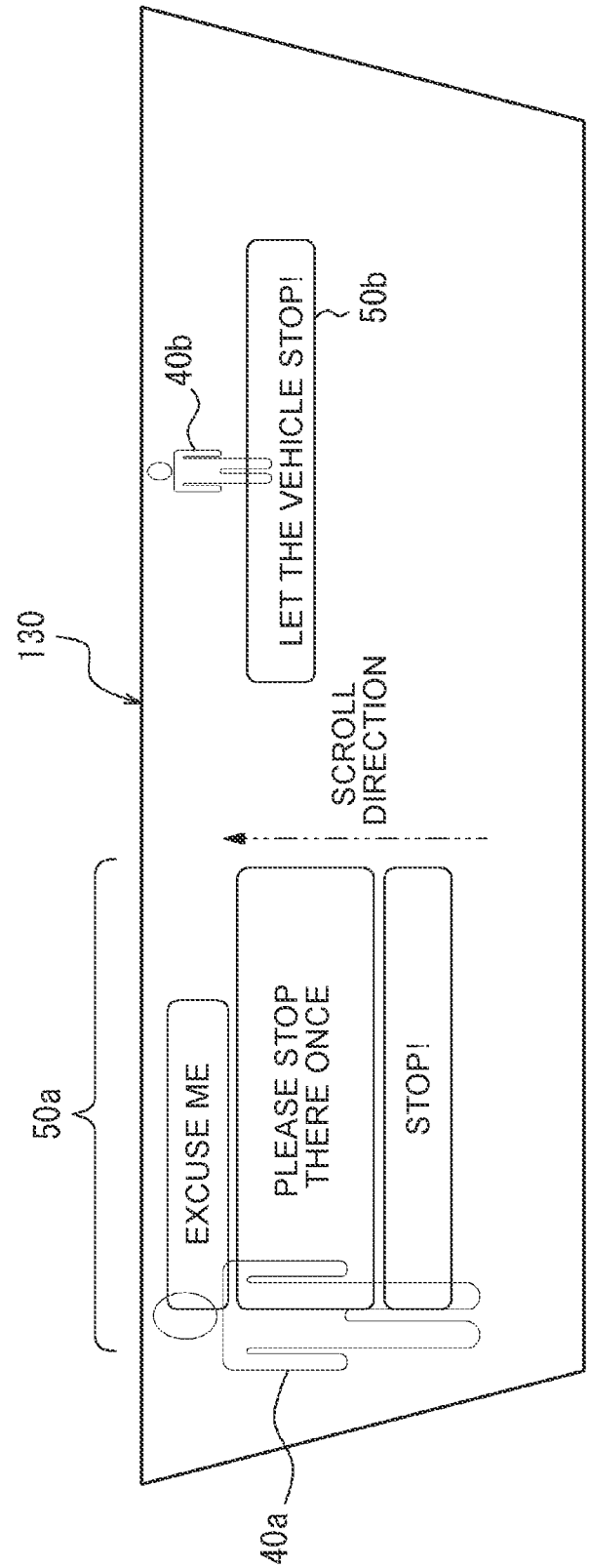
FIG. 3 is a view illustrating a first example of a screen displayed on a display device.

With reference to FIG. 3, the following describes a first example of the screen in a case where the display portion 13 is a head-up display. In FIG. 3, driving support information 50 (50a and 50b) is displayed on a windshield 130 of the vehicle 10, the windshield 130 constituting a part of the head-up display. The driving support information 50a and the driving support information 50b correspond to the sound source 40a and the sound source 40b, respectively.

The driving support information 50a includes text strings indicative of the utterance contents of the sound source 40a, "EXCUSE ME," "PLEASE STOP THERE ONCE," and "STOP!," and frames surrounding these text strings. Similarly, the driving support information 50b includes a text string indicative of the utterance content of the sound source 40b, "LET THE VEHICLE STOP!" and a frame surrounding the text string. In the first example, the driving support information 50 is displayed near the sound source 40 visually recognized by the driver through the windshield 130 or displayed to be superimposed on the sound source 40. Here, in a case where an utterance is newly made by the sound source 40, the displayed driving support information 50 may be scrolled upward on the windshield 130, for example.

In the first example of the screen of the display portion 13, the driver of the vehicle 10 can recognize the utterance content of the sound source 40 by visually recognizing the text string included in the driving support information 50. Further, the driver of the vehicle 10 can recognize a correspondence between the utterance content and the sound source 40 because the driving support information 50 is displayed at the position of its corresponding sound source 40 or near the corresponding sound source 40.

Figure 4:
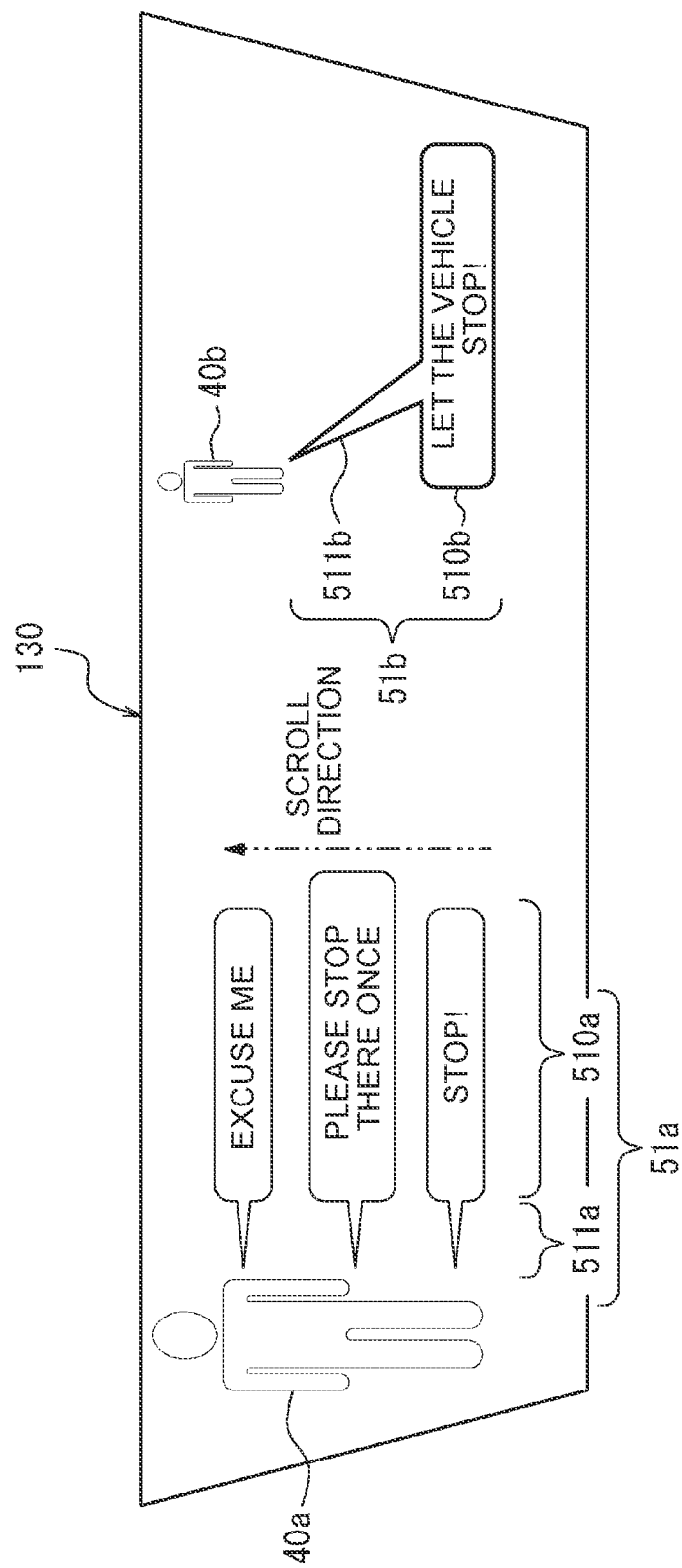
FIG. 4 is a view illustrating a second example of the screen displayed on the display device.

Subsequently, with reference to FIG. 4, the following describes a second example of the screen in a case where the display portion 13 is a head-up display. In FIG. 4, driving support information 51 (51a and 51b) is displayed on the windshield 130 of the vehicle 10. The driving support information 51a and the driving support information 51b correspond to the sound source 40a and the sound source 40b, respectively. The driving support information 51 in the second example is different from the driving support information 50 in the first example in that the driving support information 51 includes a first display element indicative of a correspondence between the driving support information 51 and the sound source 40.

More specifically, the driving support information 51a includes the text strings indicative of the utterance contents of the sound source 40a, frames 510 (510a) surrounding the text strings, and first display elements 511 (511a) projecting from respective frames 510a so as to point to the sound source 40a. Similarly, the driving support information 51b includes the text string indicative of the utterance content of the sound source 40b, a frame 510 (510b) surrounding the text string, and a first display element 511 (511b) projecting from the frame 510b so as to point to the sound source 40b. The driving support information 51 may be scrolled like the driving support information 50 in the first example.

In the second example of the screen of the display portion 13, the driver of the vehicle 10 can recognize the utterance content of the sound source 40 by visually recognizing the text string included in the driving support information 51, similarly to other examples. Further, similarly to other examples, the driver of the vehicle 10 can recognize the correspondence between the utterance content and the sound source 40 by visually recognizing the first display element 511 pointing to the sound source 40. Further, differently from the first example, it is not necessary to display the driving support information 51 at the position of the sound source 40 or near the sound source 40, so that a degree of freedom of a display position of the driving support information 51 is improved.

Figure 5:
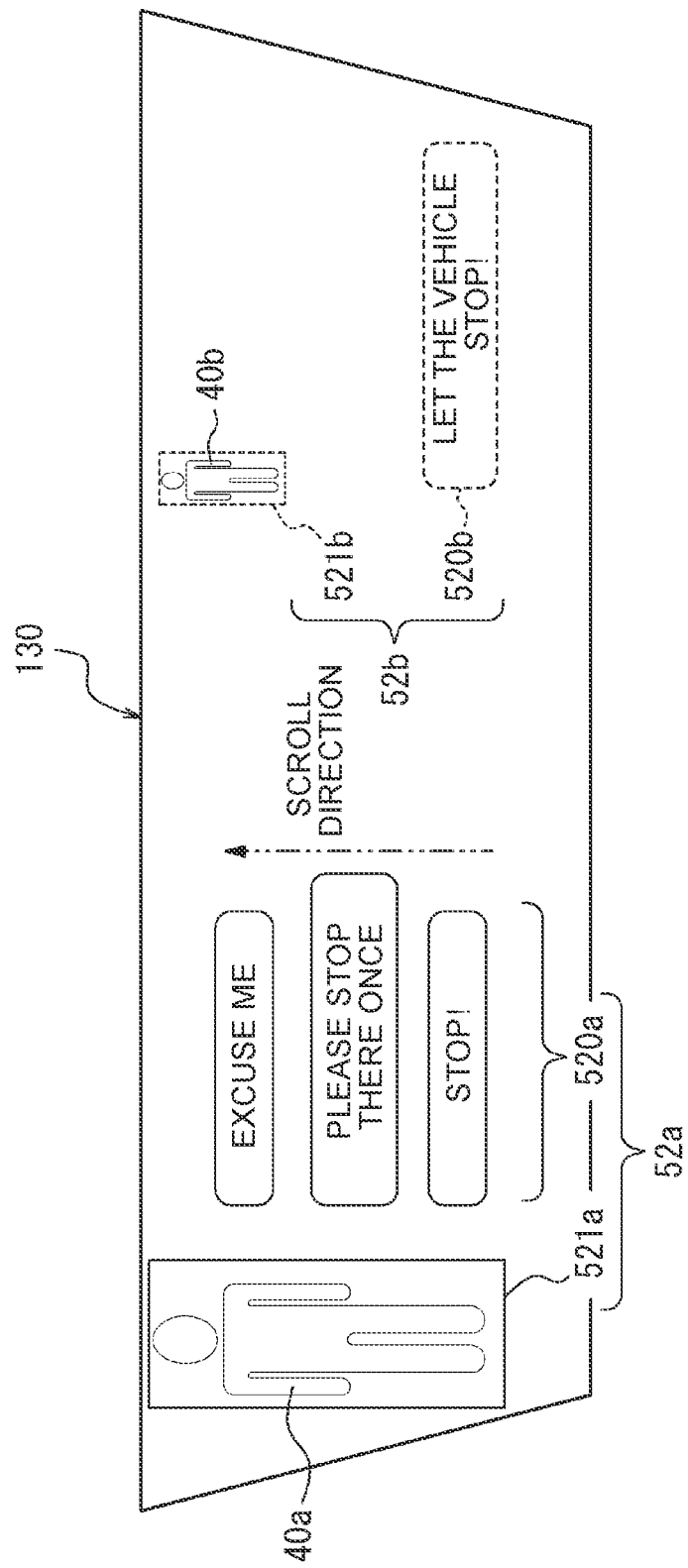
FIG. 5 is a view illustrating a third example of the screen displayed on the display device.

Subsequently, with reference to FIG. 5, the following describes a third example of the screen in a case where the display portion 13 is a head-up display. In FIG. 5, driving support information 52 (52a and 52b) is displayed on the windshield 130 of the vehicle 10. The driving support information 52a and the driving support information 52b correspond to the sound source 40a and the sound source 40b, respectively. The driving support information 52 in the third example is different from the second example in details of the first display element indicative of a correspondence between the driving support information 52 and the sound source 40.

More specifically, the driving support information 52a includes the text strings indicative of the utterance contents of the sound source 40a, frames 520 (520a) surrounding the text strings, and a first display element 521 (521a) surrounding the sound source 40a. Similarly, the driving support information 52b includes the text string indicative of the utterance content of the sound source 40b, a frame 520 (520b) surrounding the text string, and a first display element 521 (521b) surrounding the sound source 40b. The driving support information 52 may be scrolled like the driving support information 50 in the first example.

Here, the frame 520 and the first display element 521 corresponding to the sound source 40 are displayed in a common display mode. The display mode may include a type of a line, a color of the line, a shape of the line, and the like, for example. Further, the common display mode of the frame 520 and the first display element 521 are changed in accordance with the sound source 40.

In the third example of the screen of the display portion 13, the driver of the vehicle 10 can recognize the utterance content of the sound source 40 by visually recognizing the text string included in the driving support information 52, similarly to other examples. Further, since the frame 520 surrounding the text string and the first display element 521 surrounding the sound source 40 are displayed in a common display mode and the common display mode of the frame 520 and the first display element 521 are changed in accordance with the sound source 40, the driver of the vehicle 10 can recognize the correspondence between the utterance content and the sound source 40, similarly to other examples.

Figure 6:
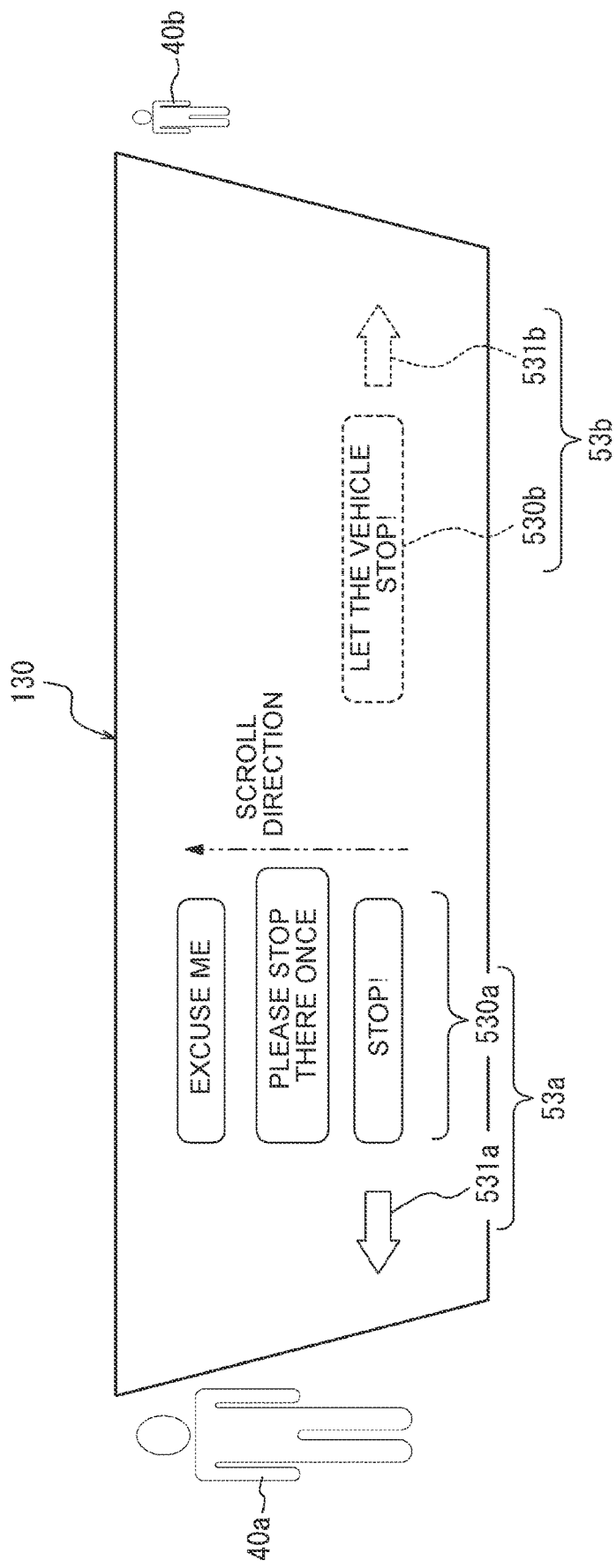
FIG. 6 is a view illustrating a fourth example of the screen displayed on the display device.

With reference to FIG. 6, the following describes a fourth example of the screen in a case where the display portion 13 is a head-up display. In FIG. 6, driving support information 53 (53*a* and 53*b*) is displayed on the windshield 130 of the vehicle 10. The driving support information 53*a* and the driving support information 53*b* correspond to the sound source 40*a* and the sound source 40*b*, respectively. The fourth example is an example that assumes a case where the sound sources 40*a* and 40*b* are placed at positions where the driver cannot visually recognize the sound sources 40*a* and 40*b* through the windshield 130. The driving support information 53 in the fourth example is different from those in the first to third examples in that the driving support information 53 includes a second display element indicative of a direction of the sound source 40 from the vehicle 10.

More specifically, the driving support information 53*a* includes the text strings indicative of the utterance contents of the sound source 40*a*, frames 530 (530*a*) surrounding the text strings, and a second display element 531 (531*a*) indicative of a direction of the sound source 40*a* from the vehicle 10. Similarly, the driving support information 53*b* includes the text string indicative of the utterance content of the sound source 40*b*, a frame 530 (530*b*) surrounding the text string, and a second display element 531 (531*b*) indicative of a direction of the sound source 40*b* from the vehicle 10. The driving support information 53 may be scrolled like the driving support information 50 in the first example.

Here, the frame 530 and the second display element 531 corresponding to the sound source 40 are displayed in a common display mode. The display mode may include a type of a line, a color of the line, a shape of the line, and the like, for example. Further, the common display mode of the frame 530 and the second display element 531 are changed in accordance with the sound source 40.

In the fourth example of the screen of the display portion 13, the driver of the vehicle 10 can recognize the utterance content of the sound source 40 by visually recognizing the text string included in the driving support information 53, similarly to other examples. Further, since the frame 530 surrounding the text string and the second display element 531 indicative of the direction of the sound source 40 from the vehicle 10 are displayed in a common display mode and the common display mode of the frame 530 and the second display element 531 are changed in accordance with the sound source 40, the driver of the vehicle 10 can recognize the correspondence between the utterance content and the sound source 40, similarly to other examples.

In a case where the controlling portion 16 of the vehicle 10 determines that the sound source 40 is placed at a position where the driver cannot visually recognize the sound source 40 through the windshield 130, the controlling portion 16 may display the driving support information 53 in the display mode of the fourth example. For example, a surrounding range, around the vehicle 10, that is visually recognizable by the driver through the windshield 130 is stored in the storage portion 15 of the vehicle 10 in advance. When the relative position of the sound source 40 from the vehicle 10 is placed outside the surrounding range, the controlling portion 16 displays the driving support information 53 in the display mode of the fourth example. Also, in a case where the relative position of the sound source 40 from the vehicle 10 is placed behind the vehicle 10, the controlling portion 16 displays the driving support information 53 in a display mode suggesting that the relative position of the sound source 40 be behind the vehicle 10.

Figure 7:
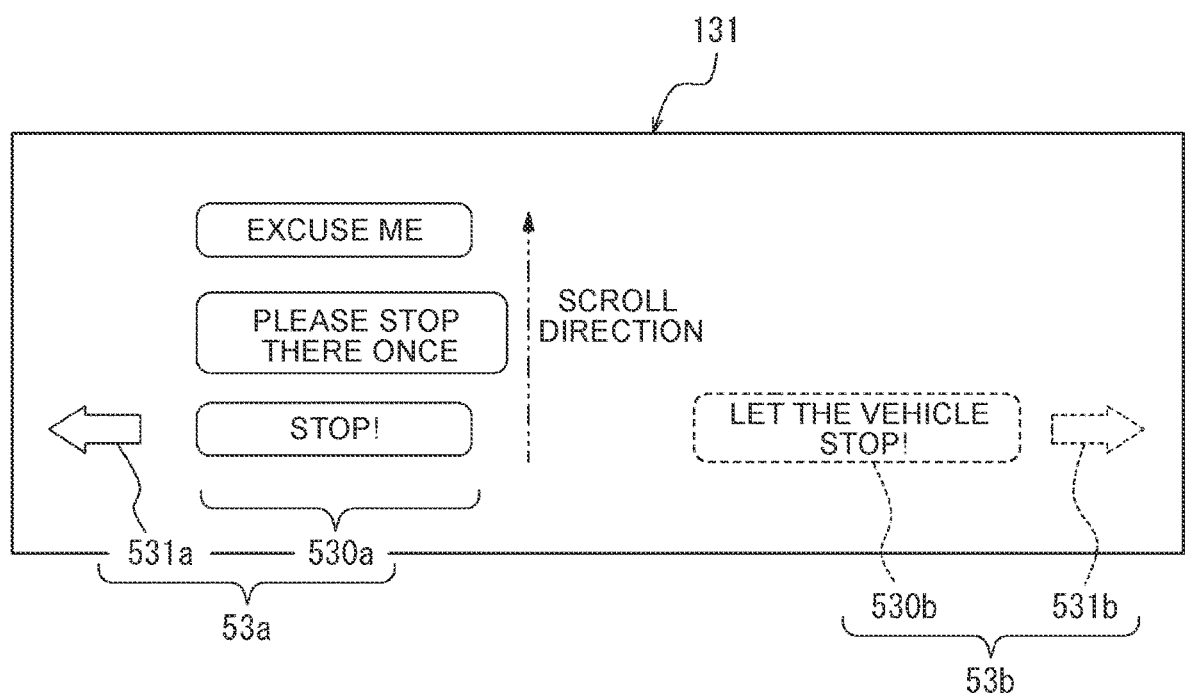
FIG. 7 is a view illustrating a fifth example of the screen displayed on the display device.

Subsequently, with reference to FIG. 7, the following describes a fifth example of the screen in a case where the display portion 13 is a panel display. In FIG. 7, the driving support information 53 (53*a* and 53*b*) is displayed on a display panel 131 of the display portion 13. Similarly to the fourth example described above, the driving support information 53 includes the text strings indicative of the utterance contents of the sound source 40, the frames 530 surrounding the text strings, and the second display element 531 indicative of the direction of the sound source 40 from the vehicle 10. The fifth example is the same as the fourth example except that the display portion 13 is a panel display.

Figure 8:
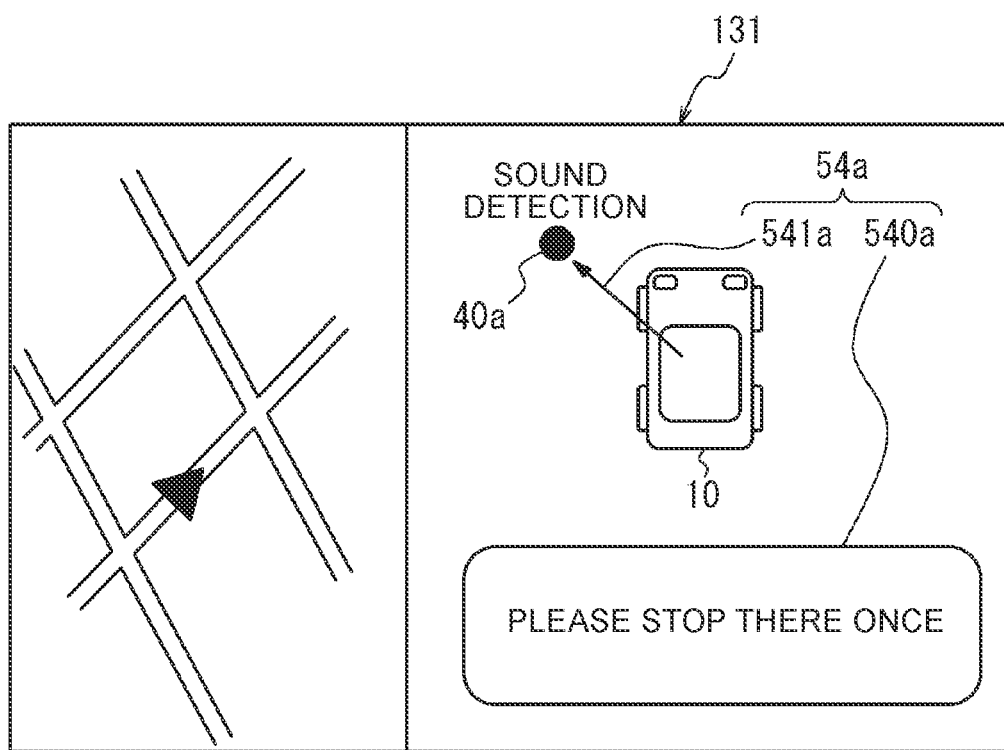
FIG. 8 is a view illustrating a sixth example of the screen displayed on the display device.

Subsequently, with reference to FIG. 8, the following describes a sixth example of the screen in a case where the display portion 13 is a panel display. In FIG. 8, an image of the vehicle 10, an image indicative of the relative position of the sound source 40*a*, and driving support information 54 (54*a*) are displayed in a right region of the display panel 131 of the display portion 13. The driving support information 54*a* corresponds to the sound source 40*a*. Further, map information by a navigation system and positional information of the vehicle 10, for example, are displayed in a left region of the display panel 131. The driving support information 54 in the sixth example is different from those in the fourth and fifth examples in details of the second display element indicative of the direction of the sound source 40 from the vehicle 10.

More specifically, the driving support information 54 includes the text string indicative of the utterance content of the sound source 40*a*, a frame 540 (540*a*) surrounding the text string, and a second display element 541 (541*a*) indicative of a direction of the image indicative of the relative position of the sound source 40*a* from the image of the vehicle 10.

In the sixth example of the screen of the display portion 13, the driver of the vehicle 10 can recognize the utterance content of the sound source 40 by visually recognizing the text string included in the driving support information 54, similarly to other examples. Further, since the second display element 541 is displayed together with the image of the vehicle 10 and the image indicative of the relative position of the sound source 40*a*, the driver of the vehicle 10 can more accurately recognize the relative position of the sound source 40 that makes the utterance, in comparison with the fifth example, for example.

Operation Procedure of Driving Support System

Figure 9:
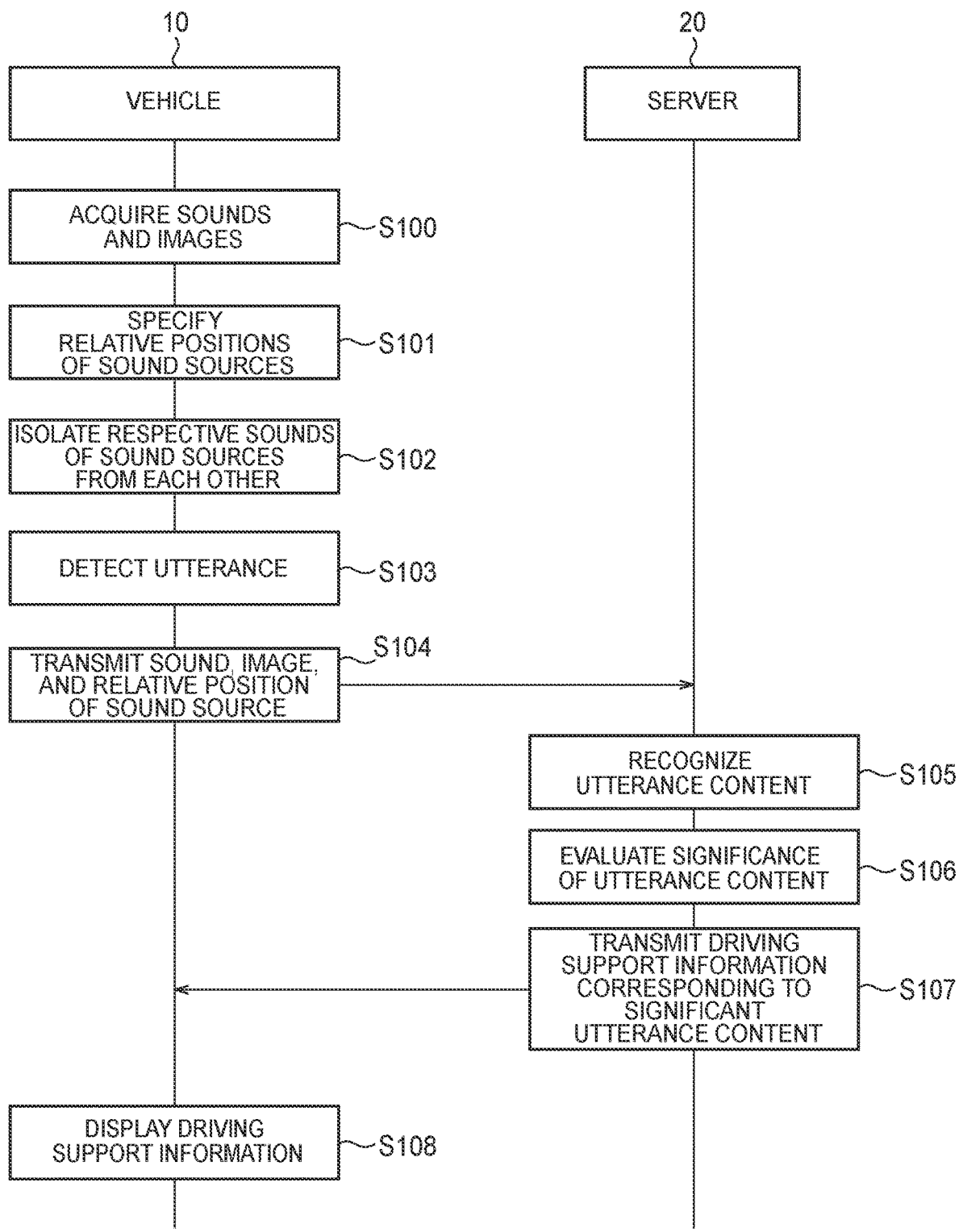
FIG. 9 is a sequence diagram illustrating an operation of the driving support system.

With reference to FIG. 9, the following describes the procedure of the operation of the driving support system 1. The operation may be performed repeatedly while an ignition of the vehicle 10 is on, for example.

Step S100: the vehicle 10 acquires sounds of the sound sources 40 placed outside the vehicle 10. Further, the vehicle 10 produces one or more captured images corresponding to the sound sources 40.

Step S101: the vehicle 10 specifies relative positions of the sound sources 40 from the vehicle 10 based on the sounds acquired in step S100.

Step S102: the vehicle 10 isolates, from each other, respective sounds of the sound sources 40 in the sounds acquired in step S100.

Step S103: the vehicle 10 performs the utterance detection process on the respective sounds thus isolated from each other so as to detect utterances in the sounds.

Step S104: the vehicle 10 transmits, to the server 20, a sound in which an utterance is detected, in association with the sound source 40 corresponding to the sound. Further, the vehicle 10 transmits, to the server 20, a relative position of the sound source 40 corresponding to the sound in which the utterance is detected and one or more captured images of the sound source 40.

Step S105: the server 20 recognizes an utterance content of the sound received from the vehicle 10 by the sound recognition process.

Step S106: the server 20 evaluates significance of the utterance content recognized in step S105.

Step S107: the server 20 transmits, to the vehicle 10, driving support information corresponding to the utterance content determined to be significant in step S106.

Step S108: the vehicle 10 displays the driving support information thus received from the server 20 in a display mode suggesting a relative position of its corresponding sound source 40.

As described above, in the driving support system 1 of the present embodiment, the driving support information corresponding to the utterance content of the sound of the sound source 40 placed outside the vehicle 10 is displayed in a display mode suggesting the relative position of the sound source 40 from the vehicle 10. With such a configuration, even in a case where the driver of the vehicle 10 cannot catch the utterance of the sound source 40, for example, the driver can recognize the utterance content at a glance by visually recognizing the driving support information. This accordingly achieves driving support for the vehicle 10 by use of a sound caused by an utterance made outside the vehicle 10. Further, even in a case where the driver does not notice the presence of the sound source 40, for example, the driver can recognize the relative position of the sound source 40 at a glance by visually recognizing the driving support information. This accordingly improves the convenience of the driving support for the vehicle 10 by use of the sound caused by the utterance made outside the vehicle 10.

The disclosure has been described based on the drawings and the embodiment, but it should be noted that a person skilled in the art can easily make various modifications and alterations based on this disclosure. Accordingly, it should be noted that those modifications and alterations are included within the scope of the disclosure. For example, a function or the like included in each means, each step, or the like is relocatable as long as it does not cause any logical contradiction, and a plurality of means, steps, or the like can be combined into one or can be divided.

For example, in the present embodiment, at least some of the processes executed by the vehicle 10 may be executed by the server 20. For example, the server 20 may execute the processes of steps S101 to S103 illustrated in FIG. 9. Similarly, at least some of the processes executed by the server 20 may be executed by the vehicle 10. For example, the vehicle 10 may execute the processes of steps S105 and S106 illustrated in FIG. 9. Further, at least some of the processes executed by the vehicle 10 or the server 20 may be executed by the vehicle 10 and the server 20 in cooperation with each other. For example, the processes of steps S101 to S103, S105, and S106 illustrated in FIG. 9 may be executed by the vehicle 10 and the server 20 in cooperation with each other.

Further, in the above embodiment, the operation procedure of the driving support system 1 has been described with reference to FIG. 9. However, some steps included in the operation procedure or some operations included in one step may be omitted. The order of the steps may be changed, provided that the change does not cause any logical contradiction.

Further, in the above embodiment, some constituents and functions of the vehicle 10 may be provided in a device that is communicable with the vehicle 10. Any given general-purpose device or exclusive device for the driving support system 1 may be used as the device. The general-purpose device may include, for example, a mobile terminal such as a smartphone, a drive recorder, a navigation device, and the like.

Further, the above embodiment describes the configuration in which the driving support information includes a text string indicative of an utterance content. However, the driving support information may include an image such as an icon indicative of an utterance content. For example, a type of an utterance content that can be recognized by the sound recognition process and driving support information including an image corresponding to the type are stored in the server storage portion 22 of the server 20 in advance. The image may be any image based on which the type of its corresponding utterance content is recognizable by the driver of the vehicle 10. For example, in the example illustrated in FIG. 10, two images corresponding to two types, i.e., "STOP" and "MOVE FORWARD," are illustrated. When the server controlling portion 23 recognizes an utterance content of a sound received from the vehicle 10, the server controlling portion 23 reads out, from the server storage portion 22, driving support information including an image corresponding to the type of the utterance content and sends it to the vehicle 10. The vehicle 10 displays the driving support information thus received from the server 20 on the display portion 13.

For example, FIG. 11 illustrates an example of a screen on which driving support information 55 as an image is displayed in a case where the display portion 13 is a head-up display. In FIG. 11, the driving support information 55 (55a and 55b) is displayed on the windshield 130 of the vehicle 10, the windshield 130 constituting a part of the head-up display. The driving support information 55a and the driving support information 55b correspond to the sound source 40a and the sound source 40b, respectively. The driving support information 55 is an image corresponding to the type of the utterance content "STOP" illustrated in FIG. 10. In the present example, the driving support information 55 is displayed near the sound source 40 visually recognized by the driver through the windshield 130 or displayed to be superimposed on the sound source 40, similarly to the exemplary screen illustrated in FIG. 3. However, the driving support information 55 may also include the first display element or the second display element similarly to the exemplary screens illustrated in FIGS. 4 to 6.

Further, the above embodiment deals with the configuration in which the driving support system 1 includes one vehicle 10. However, the driving support system 1 can be configured to include a plurality of vehicles 10. For example, the relative position of the sound source 40 from the vehicles 10 may be specified based on sounds, of the sound source 40, acquired by the vehicles 10 communicable with each other. Stated differently, the relative position of the sound source 40 is specified by use of the microphones 110 provided in the vehicles 10 communicable with each other. With such a configuration, the number of microphones 110 used for the specification of the relative position of the sound source 40 increases in comparison with the configuration in which the driving support system 1 includes one vehicle 10, for example, thereby making it possible to improve accuracy of the relative position of the sound source 40 to be specified.

Further, the above embodiment deals with the configuration in which, at the time when the point for the second sound source information is determined, one or more keywords and respective points corresponding to the keywords are stored in the server storage portion 22 of the server 20 in advance. Here, the server controlling portion 23 of the server 20 may update the information stored in the server storage portion 22. For example, the server controlling portion 23 may add a combination of a new keyword and a point corresponding to the keyword. Further, for example, the server controlling portion 23 may correct a point corresponding to a keyword.

Further, in the above embodiment, the controlling portion 16 of the vehicle 10 may be configured to display, on the display portion 13, information suggesting accuracy (e.g., recognition accuracy of an utterance content) of an execution result of the sound recognition process using a sound caused by an utterance. More specifically, the server controlling portion 23 transmits, to the vehicle 10, the accuracy of the execution result of the sound recognition process together with the driving support information. When it is determined that the accuracy received from the server 20 is less than a predetermined reference, the controlling portion 16 displays, on the display portion 13, information indicating that the recognition accuracy of the utterance content is relatively low.

Further, the above embodiment deals with an example in which the pieces of driving support information are displayed on the display portion 13 of the vehicle 10. Here, the number of pieces of driving support information simultaneously displayed on the display portion 13 or a total number of letters included in each of the pieces of driving support information simultaneously displayed on the display portion 13 may have an upper limit. With such a configuration, it is possible to reduce occurrence of inconvenience such as distraction of the driver due to a relatively large number of pieces of information being displayed on the display portion 13 of the vehicle 10, for example.

Further, a processor provided in a general-purpose electronic device such as a mobile terminal or a navigation device, for example, can function as the controlling portion 16 of the vehicle 10 of the embodiment. More specifically, this can be achieved such that a program in which a process content to implement each function of the vehicle 10 of the embodiment is stored in a memory of the electronic device, and the program is read and executed by the processor of the electronic device.

In the embodiments, the display portion may be a head-up display; and the displaying of the driving support information on the display portion may include displaying the driving support information such that at least a part of the driving support information is superimposed on the sound source.

In the embodiments, the driving support information displayed on the display portion may include a first display element, the first display element indicating a correspondence between the driving support information and the sound source.

In the embodiments, the driving support information displayed on the display portion may include a second display element, the second display element indicating a direction of the sound source from the vehicle.

In the embodiments, whether or not the driving support information is displayed on the display portion may be determined based on at least one of: i) a length of the sound or the utterance content; ii) a word included in the utterance content; iii) a context of the utterance content; iv) a sound pressure of the sound; and v) an execution result of an image recognition process using one or more captured images of the sound source.

In the embodiments, the driving support method may include displaying, on the display portion, information suggesting accuracy of an execution result of the sound recognition process.

In the embodiments, the driving support information may include at least one of a text string and an image, the text string and the image indicating the utterance content.

In the embodiments, the driving support information may include a second text string obtained by shortening a first text string indicating the utterance content.

What is claimed is:

1. A driving support method, the driving support method comprising:
   displaying, on a display in a field of view of a driver of a vehicle, driving support information corresponding to a verbal information, the display also suggesting a relative position of a sound source of a sound, wherein
   the verbal information is extracted from the sound with a voice recognition process, the sound source being outside the vehicle;
   the relative position of the sound source relative to the vehicle is determined based on the acquired sound; and
   the driving support information comprises a text string corresponding to the verbal information.

2. The driving support method according to claim 1, wherein:
   the display is a head-up display; and
   the displaying of the driving support information on the display includes displaying the driving support information such that at least a part of the driving support information is superimposed on the sound source.

3. The driving support method according to claim 1, wherein the driving support information displayed on the display includes a first display element, the first display element indicating a correspondence between the driving support information and the sound source.

4. The driving support method according to claim 1, wherein the driving support information displayed on the display includes a second display element, the second display element indicating a direction of the sound source from the vehicle.

5. The driving support method according to claim 1, wherein whether the driving support information is displayed on the display is determined based on at least one of:
   i) a length of the sound or the verbal information;
   ii) a word included in the verbal information;
   iii) a context of the verbal information;
   iv) a sound pressure of the sound; and
   v) an execution result of an image recognition process using one or more captured images of the sound source.

6. The driving support method according to claim 1, further comprising displaying, on the display, information suggesting accuracy of an execution result of the voice recognition process.

7. The driving support method according to claim 1, wherein the driving support information includes at least one of a text string and an image, the text string and the image indicating the verbal information.

8. The driving support method according to claim 1, wherein the driving support information includes a second text string obtained by shortening a first text string indicating the verbal information.

9. A vehicle comprising:
a display in a field of view of a driver of the vehicle;
a memory and processor programmed to perform the following:
  display, on the display, driving support information corresponding to a verbal information a suggested relative position of a sound source of a sound;
  extract the verbal information from the sound with a voice recognition process, the sound source being outside of the vehicle; and
  determine the relative position of the sound source relative to the vehicle based on the acquired sound;
wherein the driving support information comprises a text string corresponding to the verbal information.

10. A driving support system comprising:
a vehicle with a display in a field of view of a driver of the vehicle; and
a server configured to communicate with the vehicle, wherein:
the vehicle is configured to display, on the display, (a) driving support information corresponding to a verbal information and (b) a relative position of a sound source of a sound;
the verbal information is extracted, by the vehicle or the server, from the sound with a voice recognition process, the sound source being outside the vehicle;
the relative position of the sound source relative to the vehicle is determined, by the vehicle or the server, based on the acquired sound; and
the driving support information comprises a text string corresponding to the verbal information.

* * * * *